United States Patent [19]

Haraguchi

[11] 4,161,007
[45] Jul. 10, 1979

[54] MAGNETIC TAPE CASSETTE APPARATUS

[75] Inventor: Tamotsu Haraguchi, Musashino, Japan

[73] Assignee: TEAC Corporation, Musashino, Japan

[21] Appl. No.: 821,094

[22] Filed: Aug. 2, 1977

[30] Foreign Application Priority Data

Aug. 16, 1976 [JP] Japan .................................. 51-97530
Aug. 16, 1976 [JP] Japan .................................. 51-97531

[51] Int. Cl.² ........................................... G11B 23/04
[52] U.S. Cl. ..................................... 360/137; 360/93; 360/105
[58] Field of Search ................... 360/137, 93, 105, 96

[56] References Cited

U.S. PATENT DOCUMENTS

| 3,609,844 | 10/1971 | Ichikawa ................... | 360/96 |
| 3,623,678 | 11/1971 | Housman .................. | 360/96 X |
| 3,893,186 | 7/1975 | Yoshii ...................... | 360/96 X |
| 3,961,375 | 6/1976 | Mika et al. ................ | 360/137 |
| 4,017,900 | 4/1977 | Katsurayana ............. | 360/96 X |
| 4,071,859 | 1/1978 | Sami ........................ | 360/105 X |

FOREIGN PATENT DOCUMENTS

2336443 3/1974 Fed. Rep. of Germany ............. 360/93

*Primary Examiner*—John H. Wolff
*Attorney, Agent, or Firm*—Woodcock, Washburn, Kurtz & Mackiewicz

[57] ABSTRACT

In an apparatus having a pivotable cassette cradle with a record-playback head fixedly mounted on its hinged end, a carriage is provided which is held close to the free end of the cradle when the latter is in a record-playback position and which has mounted thereon a pair of cassette retainer leaf springs and two electrical switch assemblies to be actuated by the tape cassette carried by the cradle. The apparatus further comprises a carriage shift mechanism for retracting the carriage away from the cradle immediately upon depression of a cassette ejector/carriage retractor pushbutton, and an ejector mechanism loosely connected to the carriage shift mechanism for pivoting the cradle from the record-playback to a loading position with some delay upon depression of the pushbutton. When the cradle is manually pivoted back from the loading to the record-playback position, the carriage automatically travels back toward the cradle with some delay.

10 Claims, 14 Drawing Figures

MAGNETIC TAPE CASSETTE APPARATUS

BACKGROUND OF THE INVENTION

1. Field of the Invention

This invention relates to apparatus for recording and/or playing back information, particularly digital information, on magnetic tape packaged in the form of cassettes. More specifically, the invention is directed to improvements in a magnetic tape cassette apparatus of the type having a magnetic head fixedly mounted on a pivotable cradle for receiving and holding a tape cassette.

2. Description of the Prior Art

Magnetic tape cassettes have recently found widespread usage as the input/output medium of digital information, and there are some digital tape cassette recorders or players that have won commercial acceptance. Just like audio tape cassette players, digital cassette players usually comprise a cassette cradle pivotable between a loading position for receiving a tape cassette and a record-playback position for running the tape housed in the cassette with respect to a magnetic head for recording or playback. A cassette locking mechanism is usually provided for locking and holding the tape cassette in the record-playback position of the cradle.

In digital tape cassette apparatus of this type there are usually provided an electrical switch assembly for detecting the tape cassette as same is carried by the cradle to the record-playback position, another switch assembly for detecting one of a pair of breakable pawls provided to the cassette to prevent accidental erasure of a recording on the tape, and a cassette retainer spring or springs for biasing the tape cassette toward the magnetic head in the record-playback position of the cradle. Usually, these switch assemblies and cassette retainer spring or springs have been mounted on stationary parts of the apparatus.

This would give rise to no trouble if all the tape cassettes to be used with the apparatus were manufactured to exactly the same dimensional specifications. Since in practice some variations in the size of tape cassettes are almost unavoidable, however, the switch assemblies and the cassette retainer spring or springs may not perform their intended functions in some instances. Of course, they would function in the intended manner if their positions with respect to the under- or oversized tape cassettes were readjusted as required, but this would involve a highly troublesome procedure.

Another disadvantage of the prior art concerns the cassette retainer spring or springs in particular. Since the spring or springs are mounted on a stationary part of the apparatus so as to engage the tape cassette as same is carried to the record-playback position by the cradle, considerable resistance is thereby offered to the cradle movement, particularly from the record-playback to the loading position.

Tape cassette players have been suggested wherein detector switch assemblies, a cassette locking mechanism and other means are moved to and away from their operating positions in step with the movement of the cradle between the loading and the record-playback positions. These known devices are still unsatisfactory, however, especially in regard to smooth movement of the cradle between its two positions.

SUMMARY OF THE INVENTION

It is an object of this invention to provide an improved magnetic tape cassette apparatus so made that detector switch means and cassette retainer spring means will thoroughly perform their intended functions regardless of possible variations in the size of tape cassettes to be used with the apparatus.

Another object of the invention is to provide a magnetic tape cassette apparatus so made that the detector switch means and the cassette retainer spring means will not in any way interfere with the movement of the cassette cradle between the loading and the record-playback positions.

A further object of the invention is to provide a magnetic tape cassette apparatus which requires no particular locking mechanism for stably holding the cassette cradle in the record-playback or the loading position.

In accordance with this invention, briefly summarized, desired electrical switch means and, preferably, cassette retainer spring means are mounted on a carriage which is movable, in timed relation to the pivotal movement of the cassette cradle between the loading and the record-playback positions, toward and away from the free end of the cradle in the record-playback position. The switch means is adapted to be actuated by the tape cassette carried by the cradle, and the cassette retainer spring means is adapted to bias the tape cassette toward a magnetic head fixedly mounted on the cradle at or adjacent to its pivoted end, when the loaded cradle is moved to the record-playback position and when the carriage is moved to its operating position adjacent to the free end of the cradle.

For the desired movement of the carriage and the cradle, there are provided carriage shift means actuable manually for retracting the carriage away from the free end of the cradle, and ejector means responsive to the actuation of the carriage shift means for pivoting the cradle from the record-playback to the loading position with some delay. The carriage retractor and the ejector means are operatively associated with each other so that when the cradle is manually pivoted back from the loading to the record-playback position, the carriage automatically returns to the operating position with some delay.

In a preferred embodiment, the carriage shift means is actuable by the depression of a pushbutton, thereby causing immediate retraction of the carriage, followed by the pivotal movement of the cradle from the record-playback to the loading position. The tape cassette carried by the cradle can therefore be ejected without the least resistance from the switch means and cassette retainer spring means on the carriage which have been in abutting engagement with the cassette in the record-playback position. It will also be apparent that the switch and spring means on the carriage do not interfere with the movement of the loaded cradle back to the record-playback position, since the carriage returns to the operating position slightly after the cradle reaches the record-playback position.

An additional feature of this invention resides in two-way biasing spring means coacting with the carriage shift and the ejector means for yieldably but stably maintaining the cradle in the loading and the record-playback positions, and the carriage in the retracted and the operating positions. No other locking mechanism is required, resulting in substantial simplification of the construction of the tape cassette apparatus.

The above and other objects, features and advantages of this invention and the manner of attaining them will become more clearly apparent, and the invention itself will best be understood, from the following description and appended claims, taken together with the accompanying drawings showing a preferred embodiment of the invention.

DESCRIPTION OF THE PREFERRED EMBODIMENT

General Organization

Figure 1:
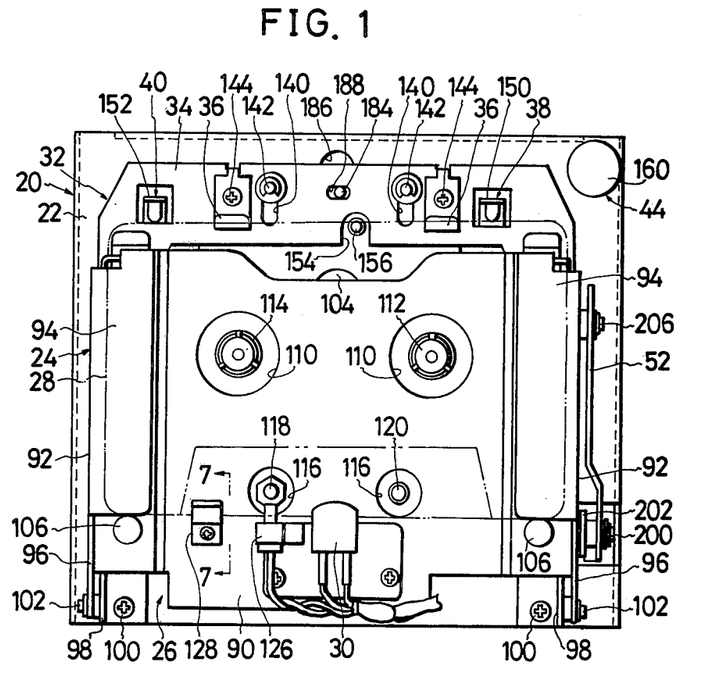
FIG. 1 is a top plan view showing the magnetic tape cassette apparatus of this invention with its top cover (not shown) removed, the view illustrating the cassette cradle in the record-playback position and the carriage in the operaing position.
Figure 2:
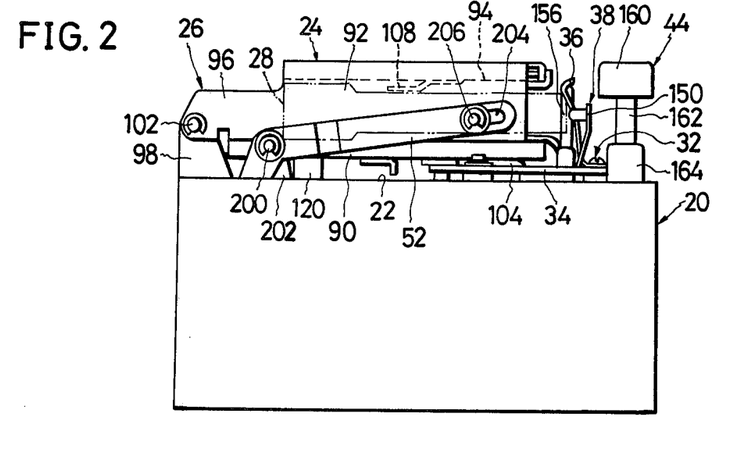
FIG. 2 is the right hand side elevational view of the apparatus of FIG. 1.

With particular reference to FIGS. 1 and 2 of the above drawings, the preferred form of the magnetic tape cassette apparatus in accordance with this invention comprises a casing 20 having a top wall 22 on which there is hingedly mounted a cassette cradle 24 forming a part of a cradle assembly 26 and defining a cavity for receiving a conventional tape 28. The cradle assembly 26 further includes a magnetic or record-playback head 30 which is fixedly mounted on the hinged end, directed downwardly as viewed in FIG. 1, of the cradle 24 for sliding contact with the tape within the cassette 28 held in position therein.

The cradle 24 is pivotable with respect to the casing 20 between a first or loading position (shown in FIG. 12), where the tape cassette 28 is to be loaded into and unloaded from the cradle through the other, free end thereof, directed upwardly as viewed in FIG. 1, and a second or record-playback position (best shown in FIGS. 2 and 11), where the tape within the cassette is to be run with respect to the record-playback head 30 for record or playback operation.

Also mounted on the top wall 22 of the casing 20 is a carriage assembly 32 including a carriage 34 which is movable between a third or retracted position (best shown in FIG. 13) remote from the free end of the cradle 24 and a fourth or operating position (best shown in FIG. 1) close to the free end of the cradle in the record-playback position, in timed relation to the pivotal movement of the cradle between the loading and the record-playback positions. The carriage assembly 32 additionally includes a pair of cassette retainer leaf springs 36 mounted on the carriage 34 for biasing the tape cassette 28 within the cradle 24 toward the record-playback head 30 when the carriage is in the operating position and the cradle in the record-playback position. Further included in the carriage assembly are two electrical switch assemblies 38 and 40 also mounted on the carriage so as to be actuated by the tape cassette 28 when the carriage is moved to the operating position and the cradle to the record-playback position.

Figure 3:
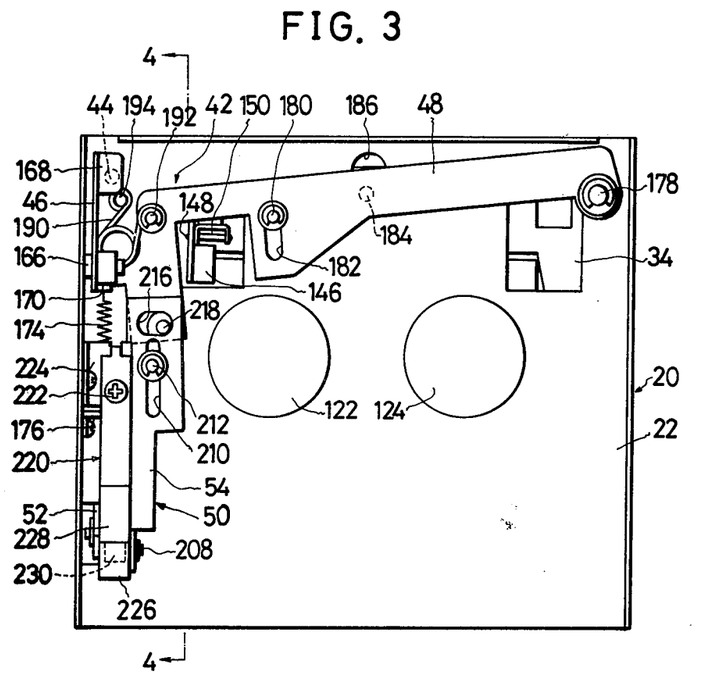
FIG. 3 is a bottom plan view of the apparatus illustrating in particular the carriage shift mechanism and ejector mechanism within the casing of the apparatus, which mechanisms are shown in conditions when the carriage is in the operating position and the cradle in the record-playback position as in FIG. 1.
Figure 4:
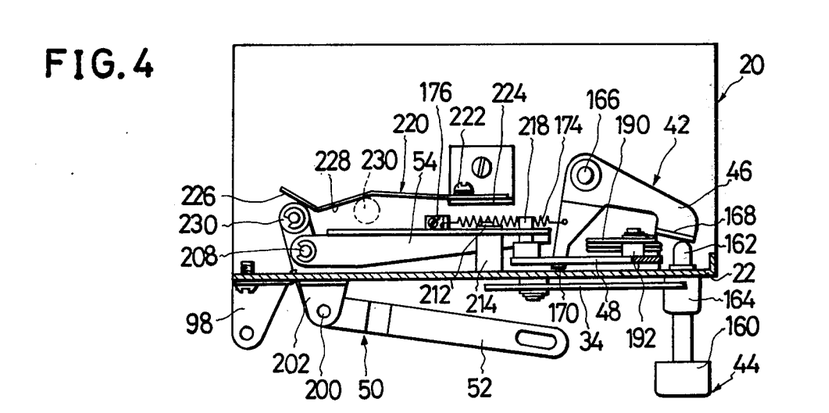
FIG. 4 is a vertical sectional view taken along the line 4—4 in FIG. 3.

FIGS. 3 and 4 best illustrate a carriage shift mechanism 42 which operates to move the carriage 34 from the operating to the retracted position upon depression of a cassette ejector/carriage retractor pushbutton 44 and which further operates to move the carriage from the retracted back to the operating position as the cradle 24 is manually pivoted from the loading to the record-playback position. The carriage shift mechanism 42 comprises a first or carriage shift lever or bell crank 46 to be pivoted in a predetermined direction by the cassette ejector/carriage retractor pushbutton 44 upon manual depression thereof, and a second or carriage shift lever 48 operatively connected to the carriage 34 and adapted to be pivoted, upon depression of the pushbutton, by the carriage shift bell crank 46 to move the carriage 34 from the operating to the retracted position.

The cassette ejector/carriage retractor pushbutton 44 is so named because the depression of this pushbutton results in the ejection of the tape cassette 28 (i.e., the movement of the cassette cradle 24 from the record-playback to the loading position) and in the retraction of the carriage 34. Strictly speaking, the bell crank 46 and the lever 48 should likewise be termed the cassette ejector/carriage shift bell crank and the cassette ejector/carriage shift lever, respectively, because they also take part in the ejection of the tape cassette, as will become more fully apparent as the description proceeds.

As best shown also in FIGS. 3 and 4, an ejector mechanism 50 is provided which is operatively and structurally associated with the carriage shift mechanism 42 for pivoting the cradle 24 from the record-playback to the loading position in timed relation to the movement of the carriage 34 from the operating to the retracted position and for permitting the cradle to be manually pivoted back from the loading to the record-playback position in timed relation to the movement of the carriage from the retracted to the operating position. The ejector mechanism 50 comprises a third or ejector lever or bell crank 52 operatively connected at one end to the cradle 24 as shown in FIGS. 1 and 2 and adapted for joint pivotal movement therewith, and a delay connector 54 loosely connecting the other end of the ejector bell crank to the carriage shift lever 48.

It will have been noted from the foregoing that the illustrated magnetic tape cassette apparatus broadly comprises the cradle assembly 26, the carriage assembly 32, the carriage shift mechanism 42, and the ejector mechanism 50. These components of the apparatus, and the tape cassette 28 for use therewith, will hereinafter be described in detail under the respective headings.

Tape Cassette

Figure 5:
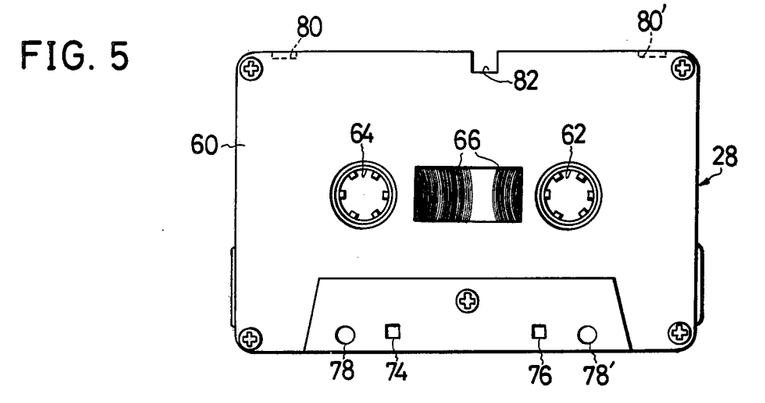
FIG. 5 is a plan view of a tape cassette suitable for use with the apparatus of the invention.
Figure 6:
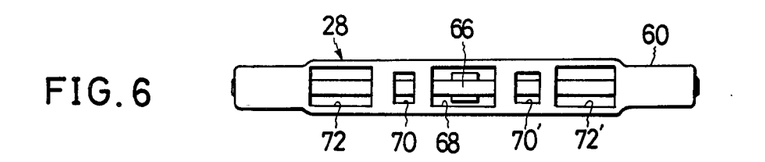
FIG. 6 is a front end elevational view of the tape cassette of FIG. 5.

As depicted in FIGS. 5 and 6, the tape cassette 28 for use with the apparatus in accordance with this invention can be of conventional make known as the Phillips type. The tape cassette includes a relatively flat, boxlike housing 60 within which a pair of hubs or reels 62 and 64 are supported for independent rotation about spaced parallel axes. A length of magnetic tape 66 is wound at least in part on the two hubs and has its ends secured respectively thereto.

The cassette housing 60 has a series of apertures 68, 70, 70', 72 and 72' formed in its front edge to partly expose the magnetic tape 66 for the record-playback head 30 and other means hereinafter set forth. Additionally, the cassette housing 60 has two pairs of transversely aligned holes or openings 74 and 76 and two other pairs of transversely aligned holes 78 and 78' formed in its opposite faces. The openings 74 and 76 are intended for the insertion of guide pins hereinafter set forth, and the holes 78 and 78' are intended for the insertion of a capstan found in usual cassette players or decks but are unnecessary in the apparatus of this invention, for the reason that will become apparent presently.

Seen at 80 and 80' are a pair of pawls formed on the rear edge of the cassette housing 60. These pawls are easily breakable to prevent accidental or undesired erasure of a recording on the magnetic tape 66. Also in the rear edge of the cassette housing 60 there is formed an indentation 82 which is located off the midpoint of the housing with respect to its side-to-side longitudinal direction, for purposes explained later.

Cradle Assembly

The cassette cradle 24 of the cradle assembly 26 has a substantially rectangularly shaped bottom wall 90 which is oriented substantially parallel to the top wall 22 of the casing 20 when the cradle is in the record-playback position as shown in FIG. 2. Additionally, the cradle 24 comprises a pair of confronting side walls 92 formed uprightly on and extending along both lateral edges of the bottom wall 90, and a pair of top walls 94 of comparatively small width extending toward each other from the top edges of the side walls and lying in a plane parallel to the bottom wall. The cradle 24 thus defines the desired cavity for receiving and holding the tape cassette 28.

For pivotally mounting the cradle 24 on the top wall 22 of the casing 20, a pair of cradle hinge brackets 96 are formed as forward extensions of the cradle side walls 92, as will be best seen from FIGS. 1 and 2. Another pair of hinge brackets 98 are screwed or otherwise fastened at 100 to the casing top wall 22. The first mentioned pair of hinge brackets 96 are coupled to the second pair of hinge brackets 98 with a pair of coaxially oriented hinge pins 102, respectively, so that the cradle 24 is pivotable between the loading and the record-playback positions about the aligned axes of these hinge pins.

FIG. 2 reveals a cradle stop 104 of hard rubber or like material secured to the casing top wall 22 and projecting upwardly therefrom to limit the pivotal movement of the cradle 24 toward same. The height of this cradle stop is determined in relation to the location of the cradle hinge pins 102 so that when the cradle 24 abuts the end of the cradle stop and lies in the record-playback position, the plane of its bottom wall 90 may be substantially parallel to the plane of the casing top wall 22.

The cradle assembly 26 further includes a pair of spaced-apart cassette stop or positioning pins 106 fixedly mounted on the bottom wall 90 of the cradle 24 at its hinged end and in the adjacency of the side walls 92. These stop pins are intended to position the cassette 28 within the cradle 24 with respect to its front-to-rear direction, as indicated by the dot-and-dash lines in FIG. 1, as the cassette is inserted, with its apertured front edge foremost, into the cradle until the cassette makes abutting engagement with the stop pins. A pair of leaf springs 108 (one seen in FIG. 2) are secured to the inner or lower surfaces of the cradle top walls 94, respectively, for urging the cassette placed therein against the cradle bottom wall 90.

Formed in the bottom wall 90 of the cradle 24 are a pair of spaced-apart circular openings 110 to permit take-up and drive spindles 112 and 114 to project upwardly therethrough, and another pair of spaced-apart smaller openings 116 to permit a pair of guide pins 118 and 120 to project upwardly therethrough. Each of the spindles 112 and 114 has a plurality of angularly spaced keys or teeth formed thereon for positive engagement with the corresponding one of the pair of internally toothed hubs 62 and 64 of the tape cassette 28. Secured to the casing top wall 22, the pair of guide pins 118 and 120 are intended to engage in the aligned openings 74 and 76 of the tape cassette 28 thereby camming the cassette into relative position with respect to the magnetic head 30 and so on. The guide pin 118 serves the additional purpose of holding a light source.

The take-up and drive spindles 112 and 114 are coupled directly to the respective output shafts of electric motors 122 and 124, FIG. 3, that are disposed within the casing 20. The magnetic tape 66 within the cassette 28 is to be run directly by these spindles which are in engagement with the cassette hubs 62 and 64 when the loaded cradle 24 is in the record-playback position, so that the apparatus has no capstan or pinch roller that is found in most cassette players or decks. Instead, the apparatus is equipped with an automatic motor speed control mechanism, not shown, which senses the running speed of the magnetic tape to control the speed of the motors 122 and 124 as required.

The cradle assembly 26 additionally comprises a photodetector 126, a tape cleaner 128, and the aforesaid record-playback head 30, which are all fixedly mounted on the bottom wall 90 of the cradle 24 at or adjacent to its hinged end. The record-playback head 30 is positioned on the cradle bottom wall so as to make contact with the magnetic tape 66 within the cassette 28 through its aperture 68 when the cassette is inserted fully into the cradle. Disposed opposite to the light source held by the guide pin 118, the photodetector 126 also partly intrudes into the tape cassette through its aperture 70 upon full insertion of the cassette into the cradle. The photodetector and the light source constitute in combination a conventional tape position sensing mechanism.

Figure 7:
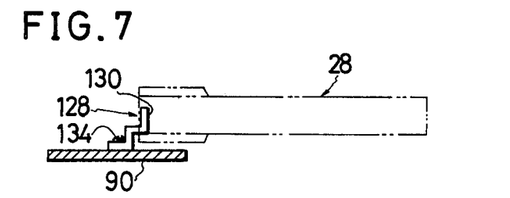
FIG. 7 is a partial, vertical sectional view taken along the line 7—7 in FIG. 1 and illustrating in particular the tape cleaner mounted on the cassette cradle and disposed for sliding contact with the magnetic tape within the cassette which is shown by the dot-and-dash lines.
Figure 8:
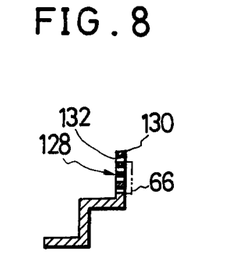
FIG. 8 is an enlarged, vertical sectional view of the tape cleaner of FIG. 7.
Figure 9:
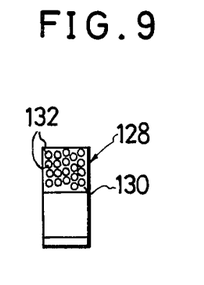
FIG. 9 is a front elevational view of the tape cleaner of FIG. 8.

Also positioned so as to partly intrude into the tape cassette 28 through its aperture 72, the tape cleaner 128 is illustrated in greater detail in FIGS. 7 through 9. The tape cleaner is in the form of a rectangularly shaped, somewhat elongate piece of sheet metal with a thickness of 0.2 millimeter, for example, that has been bent into the shape best seen in FIG. 8 to provide an upstanding working portion 130. This working portion of the tape cleaner has a multiplicity of minute perforations 132 formed therethrough by the etching technique and is convexed ever so slightly toward the magnetic tape 66 within the cassette 28 for smooth sliding contact therewith. The tape cleaner 128 is screwed or otherwise fastened at 134 to the cradle bottom wall 90 so that its perforated working portion 130 may be held lightly in contact with the magnetic tape within the cassette carried in position in the cradle 24.

Thus, as the magnetic tape 66 runs in sliding contact with the working portion 130 of the tape cleaner 128, dust particles that may have been deposited on the tape are scraped off and pass through the tape cleaner perforations 132 to be discharged out of the tape cassette 28. The magnetic tape can therefore be constantly cleaned during record or playback operation. The fixed mounting of the tape cleaner 128 in position on the cradle 24 has the advantage that the tape cleaner is conditioned to perform its function to the full merely by insertion of the tape cassette into the cradle.

Carriage Assembly

Figure 13:
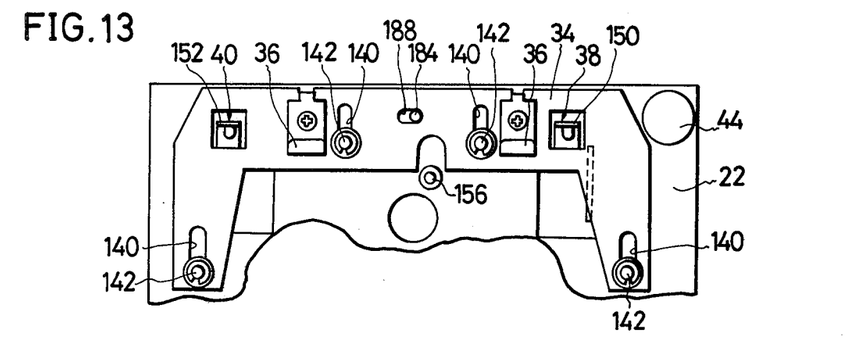
FIG. 13 is a fragmentary top plan view illustrating in particular the carriage in the retracted position.

The carriage 34 included in the carriage assembly 32 is shown in its operating position in FIG. 1 and in its retracted position in FIG. 13. With particular reference to these two drawings, the carriage 34 is in the form of an inverted-U-shaped plate, having formed therein four guide slots 140 each extending in the front-to-rear direction of the apparatus. Upstanding guide pins 142 secured to the casing top wall 22 are slidably engaged in the respective guide slots 140, so that the carriage is constrained to movement between the retracted and the operating positions in a plane parallel to the plane of the tape cassette 28 carried by the cradle 24 in the record-playback position.

As mentioned previously, the pair of spaced-apart cassette retainer leaf springs 36 are fastened at 144 to the carriage 34 in the cantilever fashion to bias the tape cassette 28 within the cradle 24 against the pair of cassette stop pins 106 when the carriage is in the operating position and the cradle in the record-playback position and hence to retain the cassette in relative position with respect to the magnetic head 30 and so on. Also mounted on the carriage 34 are the first switch assembly 38 for detecting the tape cassette 28 loaded in the cradle 24, and the second switch assembly 40 for detecting the breakable pawl 80 of the tape cassette.

In FIG. 3 is seen a Microswitch 146 forming a part of the cassette detector switch assembly 38. This Microswitch is affixed to a switch mounting bracket 148 extending downwardly from and formed integral with the carriage 34. The cassette detector switch assembly 38 further includes a switch actuator 150 in the form of a leaf spring pivotally mounted on the switch mounting bracket 148 for actuating the Microswitch 146. The cassette pawl detector switch assembly 40 is of identical construction, but only its switch actuator is seen at 152 in FIG. 1.

The switch actuators 150 and 152 are positioned on the carriage 34 so that the Microswitches of the two switch assemblies 38 and 40 may be actuated respectively by the tape cassette 28 and its pawl 80, unless it has been broken off, when the carriage is moved to the operating position and the loaded cradle to the record-playback position. Although the electrical details of this apparatus are not shown because of their common and well-known nature, it is understood that the Microswitches of the switch assemblies 38 and 40 are connected to the circuitry of the apparatus and operate in the usual manner.

The carriage 34 is recessed at 154 to provide a space through which a cassette engaging pin 156 secured to the casing top wall 22 extends upwardly. This pin is engaged in the indentation 82 in the tape cassette 28 when the loaded cradle 24 is moved from the loading to the record-playback position, provided that the cassette has been inserted into the cradle with a prescribed one of its faces directed upwardly. The prescribed cassette face is shown directed toward the viewer in FIG. 5. The tape cassette 28 cannot therefore be put to use with the illustrated apparatus if placed in the cradle 24 with its prescribed face directed downwardly, since then the cradle cannot be pivoted fully to the record-playback position.

Carriage Shift Mechanism

As will be seen from FIGS. 3 and 4 in particular, the carriage shift mechanism 42 includes or is closely associated with the cassette ejector/carriage retractor pushbutton 44 comprising a head 160 located over the casing top wall 22, and a shank 162 extending downwardly therefrom and slidably extending through a guide sleeve 164 secured to the casing top wall. The pushbutton shank 162 projects into the casing 20.

Figure 10:
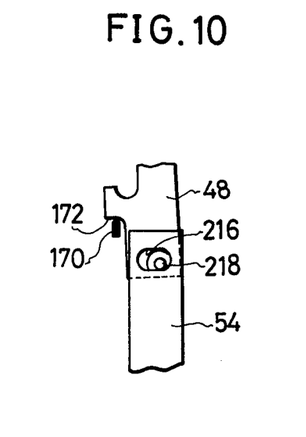
FIG. 10 is a fragmentary bottom plan view, partly in horizontal section, illustrating the details of structural relationship between the carriage shift bell crank, the carriage shift lever and the delay connector in the apparatus of the invention.

Within the casing 20 the carriage shift bell crank 46 is supported at the junction of its two arms by a pivot pin 166 on one of the casing side walls for pivotal movement in a plane normal to the plane of the carriage 34. One of the arms of the carriage shift bell crank 46 terminates in a pushbutton engaging tab 168 projecting right-angularly therefrom for abutting engagement with the pushbutton shank 162 projecting into the casing 20. The other arm of the carriage shift bell crank 46 terminates in a pawl 170 which, is illustrated in detail in FIG. 10, is engageable with a tongue 172 provided to the carriage shift lever 48 only when the bell crank is pivoted counterclockwise, as viewed in FIG. 4, about the pivot pin 166.

A tension spring 174 has one of its ends hooked onto the said other arm of the carriage shift bell crank 46 and the other end hooked onto a bracket 176 affixed to and projecting from the said one casing side wall. The carriage shift bell crank 46 is therefore biased clockwise, as viewed in FIG. 4, by the tension spring 174 so that the cassette ejector/carriage retractor pushbutton 44 is normally held in the raised position as shown.

The carriage shift lever 48 is connected at its right hand end, as viewed in FIG. 3, to the inside surface of the casing top wall 22 by a pivot pin 178 for pivotal movement in a plane parallel to the plane of the carriage 34. Such pivotal movement of the carriage shift lever 48 is limited by a limit pin 180 projecting downwardly from the inside surface of the casing top wall 22 and slidably engaged in an arcuate slot 182 formed in the carriage shift lever, so that this lever is pivotable between its FIG. 3 position and that shown in FIG. 14. The aforesaid tongue 172 is formed on the free end of the carriage shift lever 48.

As will be best understood upon consideration of FIGS. 1 and 3, a connector pin 184 extends upwardly from the midpoint of the carriage shift lever 48 through a suitable opening 186 in the casing top wall 22 and is slidably engaged in a slot 188 formed in the carriage 34, with the slot being slightly elongated in the side-to-side direction of the apparatus. Thus, upon depression of the cassette ejector/carriage retractor pushbutton 44, the carriage 34 is shifted from the operating position of FIG. 1 to the retracted position of FIG. 13 via the carriage shift bell crank 46 and the carriage shift lever 48.

One of the features of this invention resides in a two-way biasing torsion spring 190, FIG. 3, that has one of its ends somewhat loosely hooked onto a pin 192 planted on the free end of the carriage shift lever 48 and which has the other end thereof also somewhat loosely hooked onto a pin 194 projecting downwardly from the casing top wall 22. The torsion spring 190 is effective to bias the two pins 192 and 194 away from each other. It is also important to point out that the carriage shift lever 48 is pivotable through approximately the same angle on either side of a notional line extending between the carriage shift lever pivot pin 178 and the spring engaging pin 194.

Since in FIG. 3 the spring engaging pin 192 on the carriage shift lever 48 is shown located on the lower or front side of the notional line between the pins 178 and 194, the carriage shift lever is then biased counterclockwise by the torsion spring 190 to maintain the carriage 34 in the operating position of FIG. 1. Further, upon depression of the cassette ejector/carriage retractor pushbutton 44, the carriage shift lever 48 is held biased counterclockwise, as viewed in FIG. 3, during its clockwise pivotal motion until the spring engaging pin 192 thereon reaches the notional line between the pins 178 and 194. As the spring engaging pin 192 travels past this notional line with the continued depression of the pushbutton 44, however, the torsion spring 190 functions to bias the carriage shift lever 48 in a clockwise direction.

Figure 14:
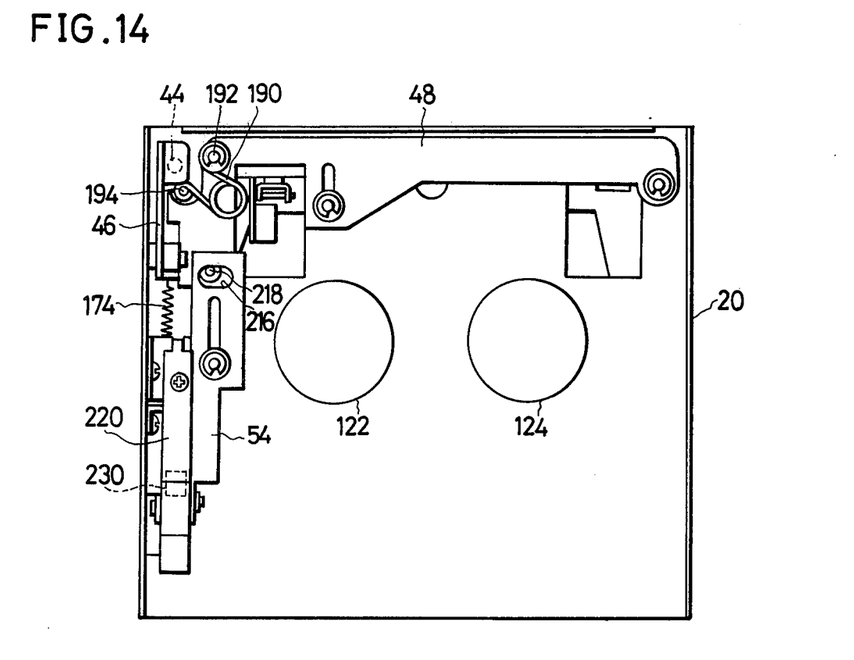
FIG. 14 is a view similar to FIG. 3 except that the carriage shift and the ejector mechanisms are shown in conditions when the carriage is in the retracted position as in FIG. 13 and the cradle in the loading position as in FIG. 12.

FIG. 14 shows the carriage shift lever 48 at the end of its clockwise pivotal motion. In this position the carriage shift lever 48 is biased clockwise by the torsion spring 190 to maintain the carriage 34 in the retracted position of FIG. 13.

Ejector Mechanism

With particular reference to FIGS. 1 through 4, the ejector mechanism 50 includes the ejector bell crank 52 which is supported at the junction of its two arms by a pivot pin 200 connected to a bracket 202 on the casing top wall 22, for pivotal movement about the pivot pin axis parallel to the aligned axes of the cradle hinge pins 102. One of the arms of the ejector bell crank 52, located over the casing top wall 22, has a slot 204 formed in its end away from the pivot pin 200. A connector pin 206 secured to the right hand side wall 92, as viewed in FIG. 1, of the cradle 24 is slidably engaged in the slot 204, so that the ejector bell crank 52 is pivotable with the pivotal motion of the cradle between the loading and the record-playback positions. Alternatively, the cradle side wall 92 may be slotted, and the connector pin 206 may be secured to the end of the ejector bell crank 52, to attain the same purpose.

The other arm of the ejector bell crank 52 projects downwardly into the casing 20 through a suitable opening formed in its top wall 22. The delay connector 54, which is of L-shaped cross section, has one of its ends pivotally pinned at 208 to an intermediate point of the said other arm of the ejector bell crank 52. This delay connector has formed therein a guide slot 210 extending in the direction normal to the axis of the ejector bell crank pivot pin 200. Slidably engaged in this guide slot 210 is a guide pin 212 affixed to a column 214 on the inside surface of the casing top wall 22.

A clearance slot 216 is formed in that end of the delay connector 54 away from the pivot pin 208 for loosely receiving a connector pin 218 planted on the free end of the carriage shift lever 48. It should be noted that the clearance slot 216 is not only elongated in the direction at right angles with the guide slot 210 in the delay connector 54 but is adapted to provide substantial clearance for the connector pin 218 in the direction of the delay connector guide slot 210.

Loosely connected to the carriage shift mechanism 42 in the above described manner, the ejector mechanism 50 does not respond immediately to the depression of the cassette ejector/carriage retractor pushbutton 44, but with some delay. Upon depression of this pushbutton, therefore, the cradle 24 starts pivoting from the record-playback toward the loading position slightly after the carriage 34 starts travelling from the operating toward the retracted position. For the same reason, when the cradle is manually pivoted back from the loading to the record-playback position, the carriage returns from the retracted to the operating position with some delay.

FIGS. 3 and 4 illustrate a two-way biasing leaf spring 220 coating with the two-way biasing torsion spring 190 to yieldably but stably maintain the cradle 24 in the loading and the record-playback positions and the carriage 34 in the retracted and the operating positions. The leaf spring 220 is cantilevered as by a screw 222 on a bracket 224 formed on the inside surface of one of the casing side walls. The free end portion of the leaf spring 220 is bent into the shape of an inverted V to provide a front slope 226 and a rear slope 228. The thus bent end portion of the leaf spring 220 is urged against a roller 230 rotatably mounted on the free end of the said other arm of the ejector bell crank 52 projecting into the casing 20.

It will be seen from FIG. 4 that the roller 230 rides on the front slope 226 of the leaf spring 220 when the carriage shift lever 48 is in the position of FIG. 3 (i.e., when the cradle 24 is in the record-playback position, with the result that the ejector bell crank 52 is then biased counterclockwise, as viewed in FIG. 4, by the leaf spring. The roller 230 rides on the leaf spring rear slope 228, as indicated by the dashed line in FIG. 4, when the carriage shift lever is in the position of FIG. 14 (i.e., when the cradle is in the loading position), with the result that the ejector bell crank is than biased clockwise. It is further understood that during the movement of the cradle 24 between the loading and the record-playback positions, the roller 230 rides on the crest of the leaf spring 220 approximately when the spring engaging pin 192 on the carriage shift lever 48 reaches the notional line between the carriage shift lever pivot pin 178 and the spring engaging pin 194.

OPERATION

Cassette Loading

Figure 12:
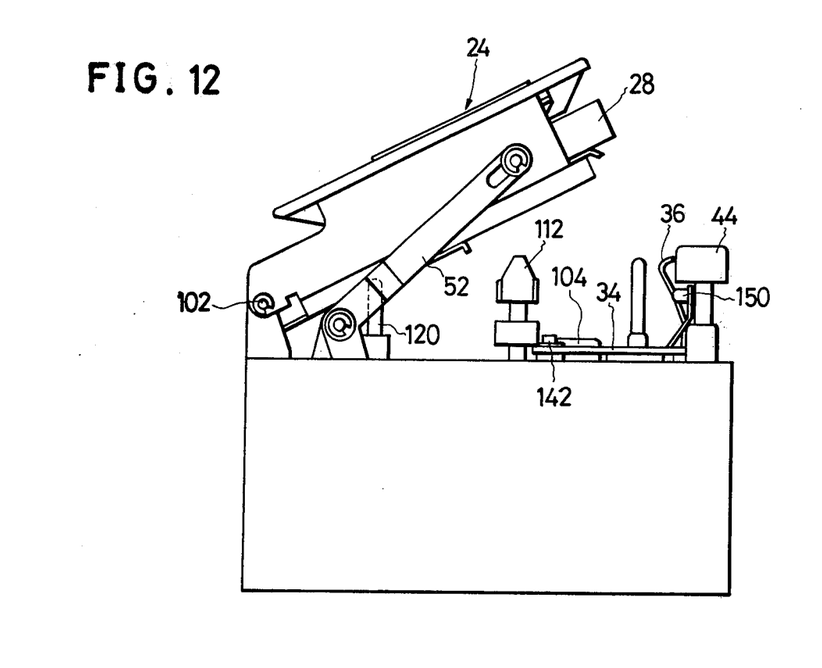
FIG. 12 is a view similar to FIG. 11 except that the loaded cradle is shown in the loading position and the carriage in the retracted position.

While the cradle 24 is held in the loading position as shown in FIG. 12, the tape cassette 28 is inserted, with its apertured front edge foremost and with its prescribed face directed upwardly, into the cradle through its free end until the cassette rests upon the pair of stop pins 106. The cradle when in the loading position is held at an angle of about 25 degrees from the plane of the casing top wall 22, and the cassette receiving cavity defined by the cradle is held higher than the tops of the take-up and drive spindles 112 and 114 and the guide pins 118 and 120, so that these members do not interfere with the insertion of the tape cassette into the cradle.

The tape cassette 28 thus fully inserted into the cradle 24, as indicated by the dot-and-dash lines in FIG. 1, is urged against the cradle bottom wall 90 by the pair of leaf springs 108. The record-playback head 30 and the tape cleaner 128 on the cradle bottom wall are now held in contact with the magnetic tape 66 within the cassette, and the photodetector 126 also lies opposite to the tape.

With the cradle 24 held in the loading position of FIG. 12, the carriage 34 is in the retracted position of FIG. 13, and the carriage shift mechanism 42 and the ejector mechanism 50 are in the conditions best shown in FIG. 14. It will be seen from FIG. 14 that the spring engaging pin 192 on the carriage shift lever 48 is now located on the upper or rear side of the notional line between the carriage shift lever pivot pin 178 and the spring engaging pin 194, so that the carriage shift lever is biased clockwise by the two-way biasing torsion spring 190. Also, the roller 230 on the ejector bell crank 52 rides on the rear slope 228 of the leaf spring 220, as indicated by the dashed line in FIG. 4, so that the ejector bell crank is biased clockwise as viewed in the drawing (counterclockwise in FIG. 12) by the two-way biasing leaf spring. As a consequence, the cradle 24 can be stably maintained in the loading position and the carriage 34 in the retracted position.

Figure 11:
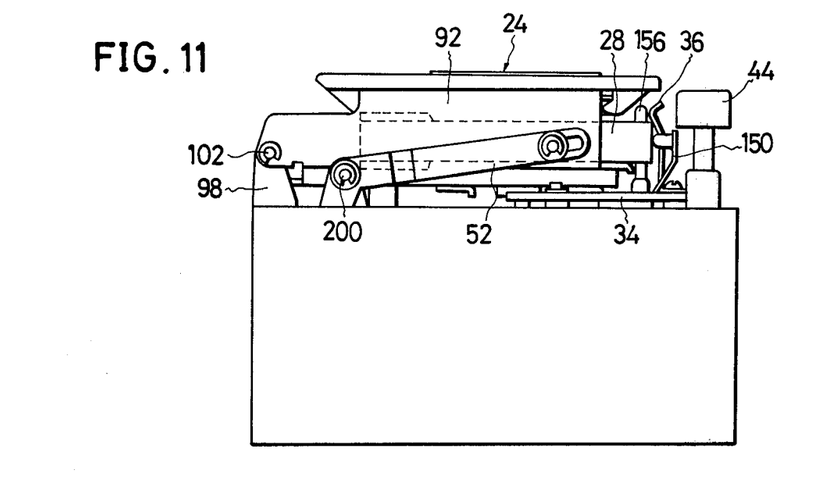
FIG. 11 is a view similar to FIG. 2 except that the cradle carries the tape cassette.

The loaded cradle 24 is then manually depressed for pivotal movement from the loading to the record-playback position of FIG. 11 about the pair of hinge pins 102. In the record-playback position the tape cassette 28 carried by the cradle is impaled upon the pair of guide pins 118 and 120 and the pair of spindles 112 and 114, with the latter engaging the pair of internally toothed hubs 62 and 64 of the tape cassette. The photodetector 126 is now oriented opposite to the light source supported by the guide pin 118 to receive the light bean transmitted thereby through the magnetic tape 66.

The ejector bell crank 52 is pivoted as aforesaid about its pivot pin 200 with the pivotal movement of the loaded cradle from the loading to the record-playback position. During approximately the first half of this pivotal movement of the loaded cradle, the roller 230 on the ejector bell crank rolls over the rear slope 228 of the leaf spring 220, so that the cradle must be depressed against the bias of this leaf spring.

Such pivotal movement of the ejector bell crank 52 is further transmitted, with some delay, to the carriage shift lever 48 via the delay connector 54 loosely receiving in its clearance slot 216 the connector pin 218 on the free end of the carriage shift lever. This carriage shift lever is therefore pivoted counterclockwise from its FIG. 14 position toward that shown in FIG. 3, against the bias of the torsion spring 190 until the spring engaging pin 192 on the carriage shift lever 48 reaches the notional line between the carriage shift lever pivot pin 178 and the spring engaging pin 194. The spring engaging pin 192 reaches this notional line approximately when the roller 230 on the ejector bell crank 52 rides on the crest of the leaf spring 220.

During substantially the first half of its pivotal movement from the loading to the record-playback position, therefore, the cradle 24 must be pressed downwardly against the forces of the torsion spring 190 and the leaf spring 220. As the spring engaging pin 192 travels past the notional line between the pins 178 and 194, the carriage shift lever 48 is biased counterclockwise, as viewed in FIG. 3 or 14, by the torsion spring 190 and is thereby rapidly pivoted to the position of FIG. 3. Also, as the roller 230 on the ejector bell crank 52 rolls past the crest of the leaf spring 220 to ride on its front slope 226, that is, as the roller moves past a notional line between the leaf spring crest and the ejector bell crank pivot pin 200, the ejector bell crank is biased counterclockwise, as viewed in FIG. 4, by the leaf spring.

It will be evident from the foregoing that the manual depression of cradle 24 is unnecessary during substantially the second half of its pivotal movement from the loading to the record-playback position, because then the cradle can be pivoted to the record-playback position under the biases of the torsion spring 190 and the leaf spring 220. If desired, the leaf spring 220 may be omitted, since the torsion spring 190 can by itself perform the functions of the leaf spring as well.

Thus pivoted to the record-playback position, the loaded cradle 24 has its bottom wall 90 in abutting contact with the cradle stop 104 as best seen in FIG. 11, and the cassette engaging pin 156 on the casing top wall 22 is engaged in the indentation 82 in the tape cassette 28. Further, as the carriage shift lever 48 is pivoted from its FIG. 14 to FIG. 3 position as above, the carriage 34 is thereby shifted from the retracted position of FIG. 13 to the operating position of FIG. 1, in the plane parallel to the plane of the tape cassette 28 carried by the cradle 24 in the record-playback position. The carriage 34 reaches the operating position slightly after the loaded cradle 24 reaches the record-playback position, as explained previously, so that there is absolutely no possibility of the switch actuators 150 and 152 and the cassette retainer leaf springs 36 being damaged by the tape cassette 29 or interfering with its movement to the record-playback position of the cradle.

With the loaded cradle 24 and the carriage 34 thus moved to the record-playback and the operating positions as shown in FIG. 11, the pair of cassette retainer leaf springs 36 bias the tape cassette 28 against the pair of stop pins 106, and the Microswitches of the cassette detector and pawl detector switch assemblies 38 and 40 are actuated via their actuators 150 and 152.

For record or playback operation, the electric motor 122 is set in motion to rotate the take-up spindle 112 in a predetermined direction, and the other motor 124 is utilized in the known manner to impart so-called back tension to the magnetic tape 66 as same is transferred from one hub to the other within the cassette 28. Not only the cassette retainer leaf springs 36 but also the switch actuators 150 and 152 and held in abutment against the tape cassette 28 by virtue of their own resiliency as long as the loaded cradle 24 and the carriage 34 remain in the record-playback and the operating positions respectively.

It should be appreciated that since the cassette retainer leaf springs 36 and the cassette and pawl detector switch assemblies 38 and 40 are mounted on the carriage 34, they can be moved into relative position with respect to the tape cassette 28 within the cradle 24 in the record-playback position merely by suitable determination of the operating and the retracted positions of the carriage. The leaf springs 36 and the switch assemblies 38 and 40 will perform their intended functions to the full regardless of possible variations in the size of tape cassettes to be used with the apparatus of this invention. It is also noteworthy that the apparatus requires no particular cassette locking mechanism for retaining the tape cassette 28 in the record-playback position, since the torsion spring 190 and the leaf spring 220 coact to hold the cassette in that position.

Ejection

For moving the cradle 24 from the record-playback to the loading position, the cassette ejector/carriage retractor pushbutton 44 is depressed by finger pressure thereby causing the carriage shift bell crank 46 to pivot counterclockwise, as viewed in FIG. 4, about the pivot pin 166 against the bias of the tension spring 174. This counterclockwise pivotal movement of the carriage shift bell crank is immediately transmitted to the carriage shift lever 48 via the pawl 170 of the former in engagement with the tongue 172 of the latter, causing the carriage shift lever to pivot from its FIG. 3 position toward that of FIG. 14.

During substantially the first half of its pivotal movement from the FIG. 3 to the FIG. 14 position, the carriage shift lever 48 encounters resistance by the torsion spring 190, as explained previously, but during the second half is thereby urged toward the FIG. 14 position. The carriage 34 is thus shifted from the operating position of FIG. 1 to the retracted position of FIG. 13, carrying the cassette retainer leaf springs 36 and the detector switch actuators 150 and 152 out of contact with the tape cassette 28.

The delay connector 54 of the ejector mechanism 50 is pulled upwardly, as viewed in FIG. 3, by the carriage shift lever 48 only after latter has been pivoted through a slight angle from the FIG. 3 toward the FIG. 14 position. As a consequence, the ejector bell crank 52 starts pivoting clockwise, as viewed in FIG. 4, with the cradle 24 against the bias of the leaf spring 220 slightly after the carriage 34 has started moving from the operating toward the retracted position.

The cassette ejector/carriage retractor pushbutton 44 must be depressed until the spring engaging pin 192 on the carriage shift lever 48 travels past the notional line between the carriage shift lever pivot pin 178 and the spring engaging pin 194 and until, substantially concurrently, the roller 230 on the ejector bell crank 52 rides onto the rear slope 228 of the leaf spring 220. Thereafter, even if the pushbutton is released, the torsion spring 190 and the leaf spring 220 coact to move the cradle 24 to the loading position of FIG. 12 and the carriage 34 to the retracted position of FIG. 13 via the carriage shift lever 48, the ejector bell crank 52 and the delay connector 54.

Thus, upon depression of the cassette ejector/carriage retractor pushbutton 44, the carriage 34 starts retracting just prior to the start of movement of the cradle 24 from the record-playback to the loading position. The cradle 24 can therefore be pivoted away from the record-playback position without the resistance which might otherwise be offered to the movement of the tape cassette 28 carried therein by the cassette retainer leaf springs 36 and the detector switch actuators 150 and 152 on the carriage 34. Also, the cradle can be smoothly pivoted away from the record-playback position regardless of the forces which have been exerted on the tape cassette by the retainer and switch actuator leaf springs.

Although the magnetic tape cassette apparatus in accordance with this invention has been shown and described in terms of its preferred form, it is understood that the invention itself is not to be restricted by the exact details of this disclosure, since numerous modifications and changes will readily occur to those skilled in the art. For example, the ejector bell crank may be loosely connected directly to the carriage shift lever, thereby omitting the delay connector. This and other modifications and equivalents are considered to fall within the scope of this invention as sought to be defined by the following claims.

What is claimed is:

1. In a magnetic tape cassette apparatus of the type having a cassette cradle pivoted at one end for movement between a first position for loading and unloading a tape cassette into and from the cradle through the other end thereof and a second position for running the tape within the tape cassette with respect to a magnetic head fixedly mounted on the cradle at said one end thereof, the improvement comprising:
   a carriage adapted for movement between a third position remote from said other end of said cradle in said second position and a fourth position adjacent to said other end of said cradle in said second position;
   electrical switch means mounted on said carriage so as to be actuated by the tape cassette carried by said cradle when the latter is moved from said first to said second position and when said carriage is moved from said third to said fourth position;
   carriage shift means actuable manually for moving said carriage from said fourth to said third position; and
   ejector means responsive to the actuation of said carriage shift means for moving said cradle from said second to said first position, the motion from said second to said first position being delayed until at least after said carriage has begun to move from said fourth to said third position;
   said carriage shift means and said ejector means being operatively associated with each other so that upon movement of said cradle from said first to said second position by direct manual actuation thereof, said carriage is moved from said third to said fourth position, said cradle reaching said second position before said carriage reaches said fourth position.

2. The magnetic tape cassette apparatus as recited in claim 1, wherein said electrical switch means comprises:
   first switch means for detecting the tape cassette carried by said cradle and held in said second position of said cradle; and
   second switch means for detecting a breakable pawl provided to the tape cassette to prevent accidental erasure of a recording on the tape contained therein.

3. The magnetic tape cassette apparatus as recited in claim 1, further comprising cassette retainer spring means mounted on said carriage for biasing the tape cassette loaded in said cradle toward said one end thereof when said cradle is moved from said first to said second position and when said carriage is moved from said third to said fourth position.

4. In a magnetic tape cassette apparatus of the type wherein a cradle adapted to hold a tape cassette therein is pivoted at one end on a casing for movement between a first position for loading and unloading the tape cassette into and from the cradle through the other end thereof and a second position for running the tape within the tape cassette with respect to a magnetic head fixedly mounted on the cradle at said one end thereof, the improvement comprising:

a carriage mounted on said casing for movement between a third position remote from said other end of said cradle in said second position and a fourth position adjacent to said other end of said cradle in said second position;

electrical switch means on said carriage adapted to be actuated by the tape cassette carried by said cradle when the latter is moved from said first to said second position and when said carriage is moved from said third to said fourth position;

a manually actuable member;

carriage shift means for moving said carriage between said third and said fourth positions, said carriage shift means being responsive to the actuation of said manually actuable member for moving said carriage from said fourth to said third position; and ejector means including a delay means, said ejector means being loosely connected to said carriage shift means for moving said cradle from said second to said first position in response to the actuation of said manually actuable member;

whereby upon movement of said carriage from said fourth to said third position by actuation of said manually actuable member, said cradle is moved from said second to said first position with some delay introduced by said delay means, and upon movement of said cradle from said first to said second position by direct manual actuation thereof, said carriage is moved from said third to said fourth position with some delay introduced by said delay means.

5. The magnetic tape cassette apparatus as recited in claim 4, wherein said carriage is movable between said third and said fourth positions in a plane parallel to the plane of the tape cassette carried by said cradle when the latter is in said second position.

6. The magnetic tape cassette apparatus as recited in claim 5, wherein said carriage shift means comprises:

a first lever adapted to be pivoted in a predetermined direction by said manually actuable member upon actuation thereof; and a second lever pivotable in a plane parallel to the plane of said carriage and operatively connected thereto, said second lever being adapted to be pivoted, upon actuation of said manually actuable member, by said first lever in such a direction that said carriage is moved from said fourth to said third position.

7. The magnetic tape cassette apparatus as recited in claim 6, wherein said ejector means comprises:

a third lever pivotally mounted on said casing and operatively connected to said cradle so as to be pivotable with the pivotal movement of said cradle between said first and said second positions; and connector means loosely connecting said third lever to said second lever so as to transmit the pivotal movement of the former to the latter, and vice versa, with some delay.

8. The magnetic tape cassette apparatus as recited in claim 7, further comprising a two-way biasing torsion spring operatively engaged at one end with said second lever and at the other end with said casing, said torsion spring being adapted to bias said carriage toward said fourth position substantially during the latter half of the movement thereof from said third to said fourth position and to bias said carriage toward said third position substantially during the latter half of the movement thereof from said fourth to said third position, said torsion spring being further effective to bias said cradle toward said second position substantially during the latter half of the movement thereof from said first to said second position and to bias said cradle toward said first position substantially during the latter half of the movement thereof from said second to said first position.

9. The magnetic tape cassette apparatus as recited in claim 4, further comprising resilient means adapted to bias said cradle toward said second position and said carriage toward said fourth position substantially during the latter halves of the movement of said cradle from said first to said second position and of said carriage from said third to said fourth position, said resilient means being further adapted to bias said cradle toward said first position and said carriage toward said third position substantially during the latter halves of the movement of said cradle from said second to said first position and of said carriage from said fourth to said third position.

10. The magnetic tape cassette apparatus as recited in claim 4, further comprising a tape cleaner fixedly mounted on said cradle at said one end thereof.

* * * * *